J. BODA.
MANURE SPREADER.
APPLICATION FILED NOV. 9, 1914.
1,205,950.
Patented Nov. 21, 1916.
3 SHEETS—SHEET 1.
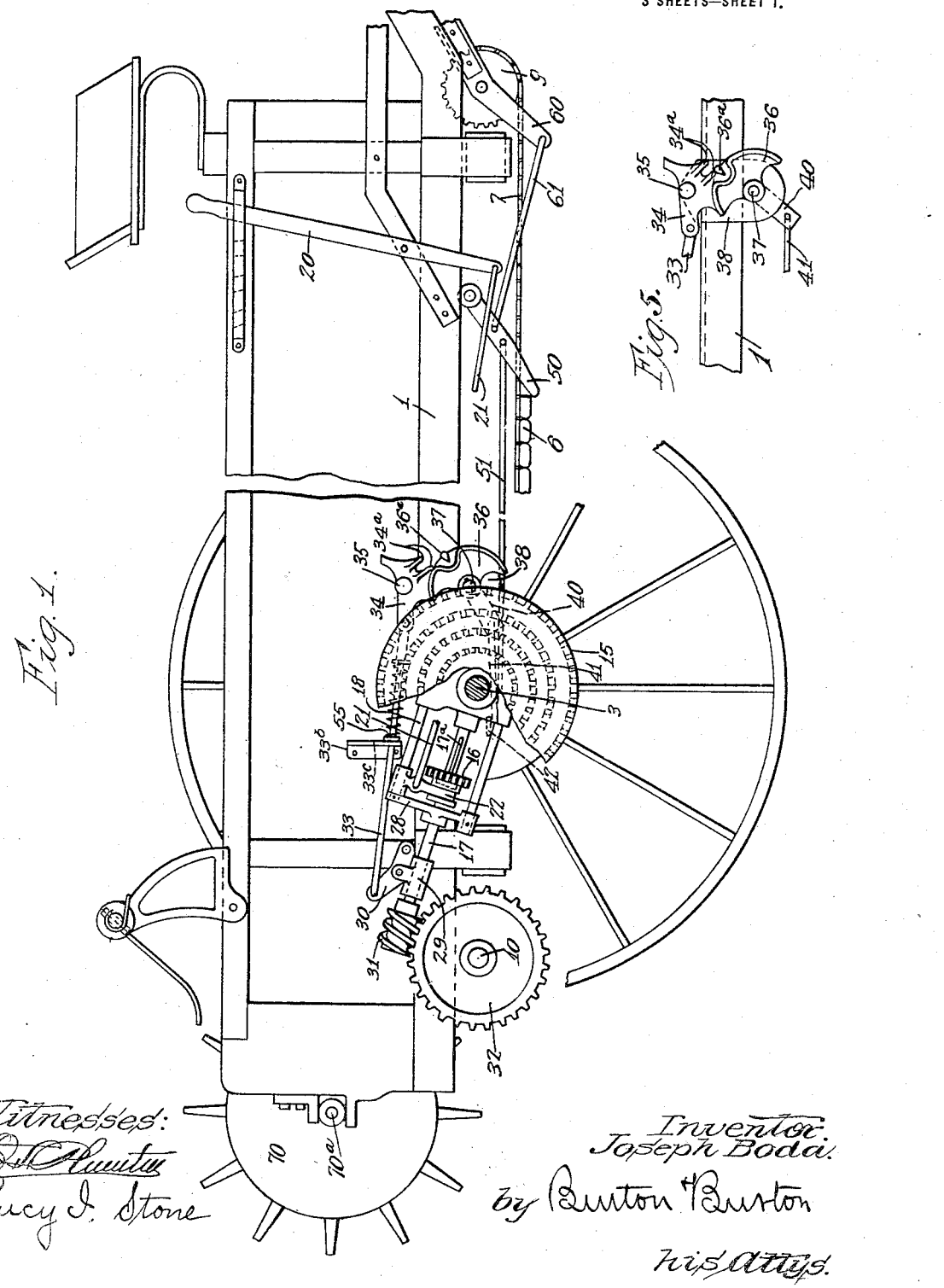

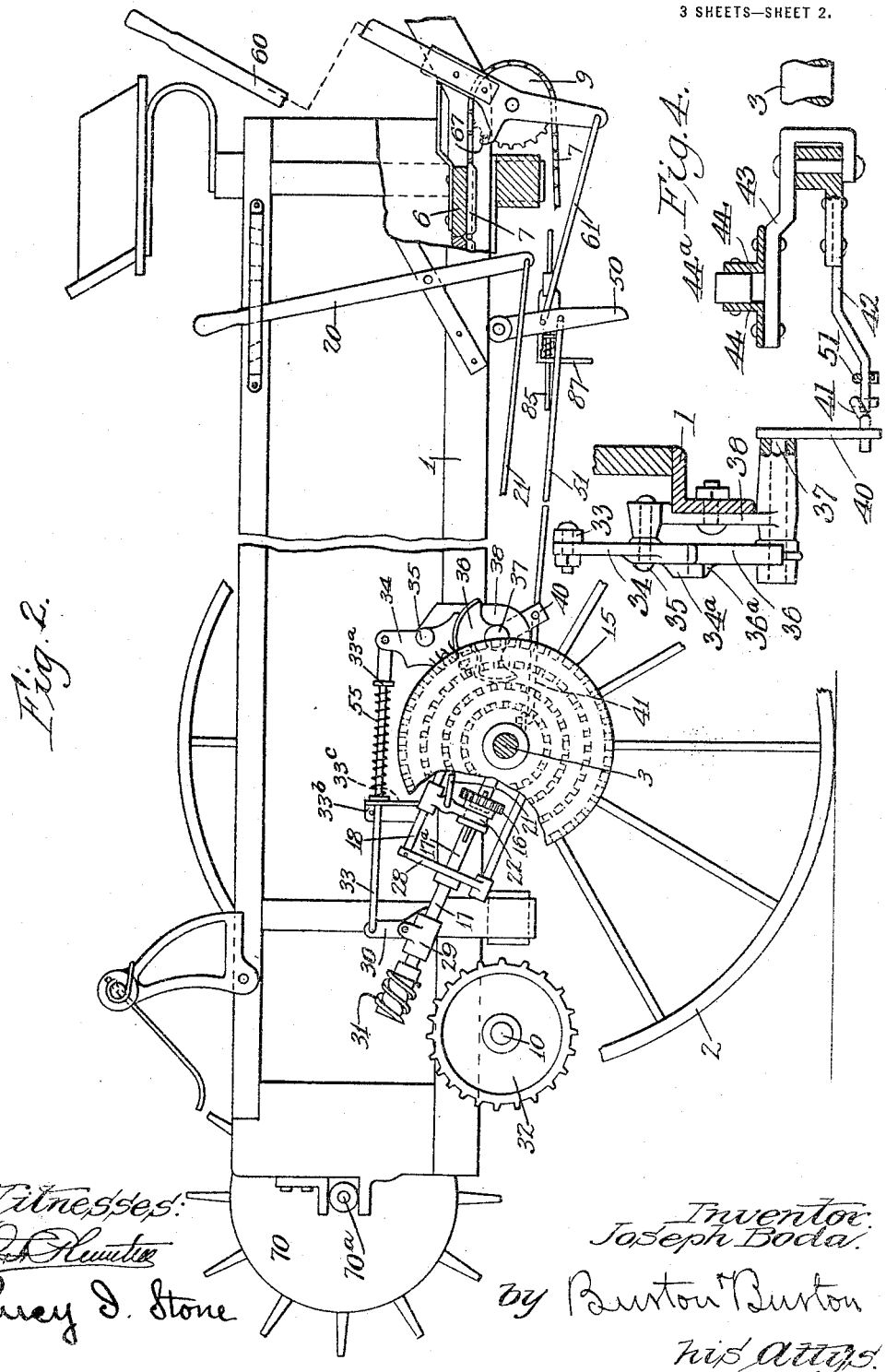

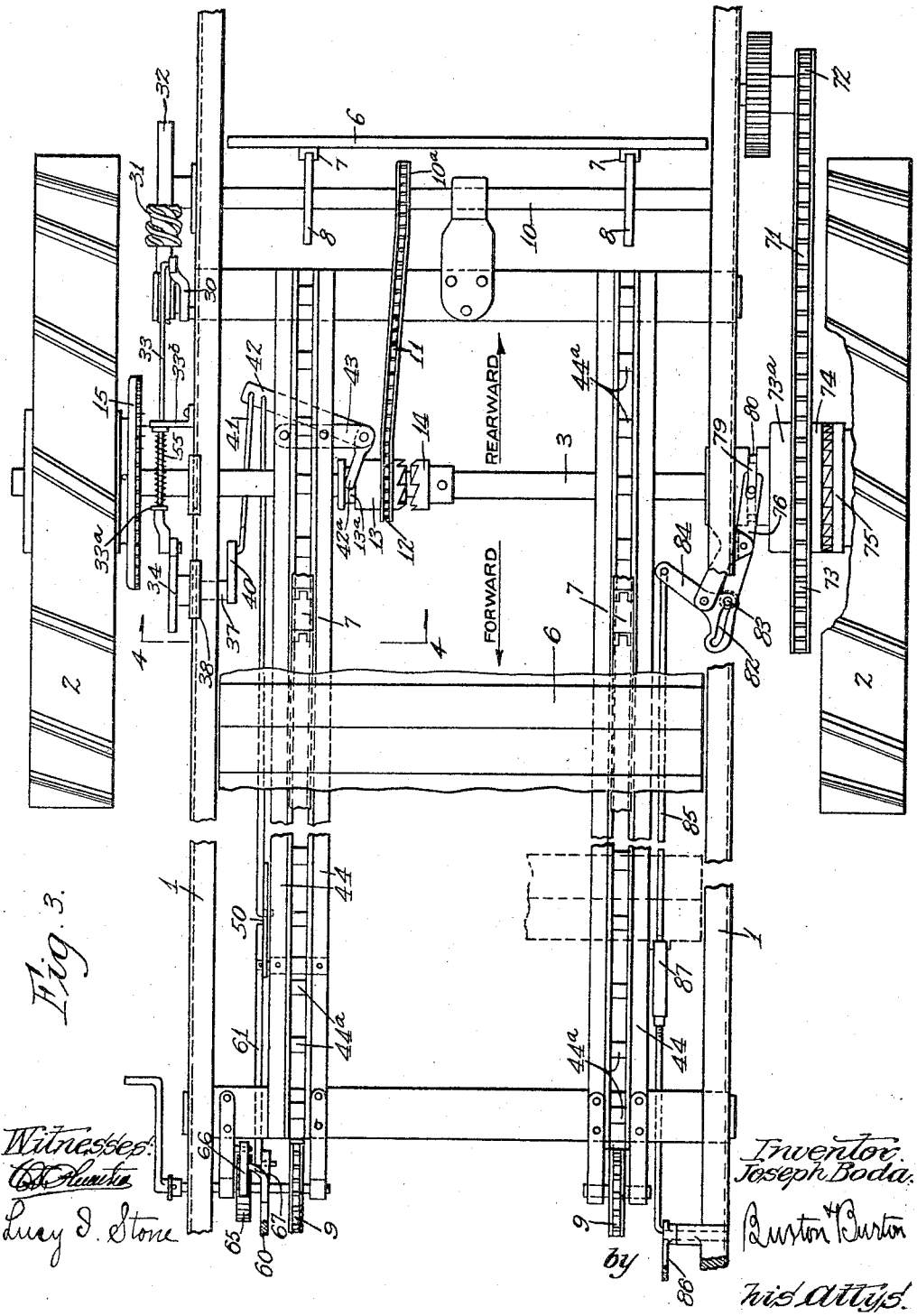

UNITED STATES PATENT OFFICE.

JOSEPH BODA, OF PLANO, ILLINOIS, ASSIGNOR TO THE INDEPENDENT HARVESTER COMPANY, OF PLANO, ILLINOIS, A CORPORATION OF ILLINOIS.

MANURE-SPREADER.

1,205,950.  Specification of Letters Patent.  Patented Nov. 21, 1916.

Application filed November 9, 1914. Serial No. 870,956.

*To all whom it may concern:*

Be it known that I, JOSEPH BODA, a citizen of the United States, residing at Plano, in the county of Kendall and State of Illinois, have invented new and useful Improvements in Manure-Spreaders, of which the following is a specification, reference being had to the accompanying drawings, forming a part thereof.

The purpose of this invention is to provide an improved construction of a manure spreader, particularly with respect to the driving of the spreader apron and engaging and disengaging same for driving and stopping.

It consists in the elements and features of construction shown and described, as indicated in the claims.

In the drawings: Figure 1 is a right side elevation of a manure spreader embodying this invention, the drive wheel at the right hand side being in part broken away and portions of the train casing being broken away to disclose the operating devices, the apron-delivery drive train being shown in engagement for operating the apron to deliver the material. Fig. 2 is a similar view showing the apron-delivery drive train disengaged. Fig. 3 is a plan view of the mechanism. Fig. 4 is a section at the line, 4—4 on Fig. 3. Fig. 5 is a detail elevation of a cam concerned in engaging and disengaging the apron with the power shaft.

The spreader shown in the drawings is of the generally familiar type, comprising a frame or body represented by the sills, 1, mounted upon carrying and traction wheels, 2—2 and front wheels, not shown in the drawings, the traction wheels being clutched to the axle, 3, in perfectly familiar manner by means not shown, permitting the two wheels to have different speed in traveling on a curve while the axle is continuously driven when the machine is in travel. The carrying device is an apron, 6, composed of bars or slats carried by endless chains, 7, 7, each traveling about a driving wheel or head, 8, and an idle sprocket wheel, 9, the two driving wheels or heads, 8, 8, being mounted rigidly on a shaft, 10, which has also a sprocket wheel, 10ª, rigidly mounted upon it and driven by a chain, 11, passing about said sprocket wheel and about a sprocket wheel, 12, which is rigid with a clutch member, 13, loose on the axle, 4, and adapted to slide thereon into and out of engagement with a clutch member, 14, which is fast on the axle for rotation therewith. Also fast on the axle there is a gear wheel, 15, of a familiar type having a plurality of concentric banks of gear teeth for engaging a pinion, 16, mounted on a shaft, 17, and adapted to move in its bearings to engage said pinion at will in accordance with adjustment, with one or another of said banks of gear teeth, for varying the speed at which the apron is actuated in its delivery travel. This part of the construction does not constitute any part of the present invention and being old and familiar, need not be more particularly described, except to point out that the pinion, 16, feathered on its shaft as shown at 17ª, is adjusted there-along by means of a hand-lever, 20, having a link, 21, connected to the fork, 22, which is mounted for sliding parallel with the shaft, 17, and engages the hub of the pinion, 16, for sliding it along the shaft as described when the lever, 20, is operated by the driver.

The shaft, 17, has bearings provided for it in a frame, 28, pivoted for swinging about the axle and having the slide bearings, 18, for the fork, 22, above mentioned; and said shaft, 17, has an additional bearing, 29, carried by a lever, 30, which is fulcrumed on the frame, and actuated as hereinafter described for swinging the shaft, 17, about the axle to carry the worm, 31, which is mounted fixedly upon the rear end of said shaft into and out of engagement with the worm wheel, 32, which is fast on the apron-driving shaft, 10. For swinging the shaft, 17, as described, to carry the worm into and out of engagement with the worm-wheel, the lever, 30, has connected with it an operating link, 33, whose forward end is connected to a mutilated gear, 34, at a distance from the center of said gear, which is journaled on its stud axle 35, rigid with the frame. The mutilated gear, 34, engages with a coöperating mutilated gear, 36, which is mounted at the outer end of the rock shaft, 37, which is journaled in a bracket, 38, mounted rigidly on the sill, 1, at the under side thereof. Conveniently said bracket, 38, also affords support for the rigid stud, 35, upon which the mutilated gear, 34, is mounted, as above stated. (See Fig. 4). At the inner side of the sill, 1, at the inner side of the journal bearing of the rock shaft, 37, on the bracket, 38, there is rigid with said rock shaft a lever arm, 40. This lever arm is connected by a link, 41, with a bell crank lever, 42, which is fulcrumed at its angle upon a bracket, 43, which obtains support conveniently, (but not necessarily) upon the under side of the angle bars, 44, 44, which form the track for the apron-propelling chain, (rollers, 44ª, 44ª, being mounted between the vertical flanges of said angle iron bars to ease the travel of the chains there-along). The short arm, 42ª of the bell-crank lever, 42, is a fork which engages a groove, 13ª, in the loose clutch member, 13, above mentioned, so that the swinging of said lever about its fulcrum at its angle operates to slide the loose clutch member, 13, into and out of engagement with the clutch member 14, fast on the axle, 3.

Pivoted upon the under side of the sill, 1, near the forward end of the machine, so as to be normally depending from the sill, there is a tappet or lever arm, 50, which hangs exposed in the path of the extreme slat of the apron in its lower ply, as said lower ply moves forward during the rearward or delivery travel of the apron. From this tappet or lever arm, 50, a link, 51, extends to the longer arm of the lever, 42, and thereby upon the said extreme slat of the lower ply of the apron in its forward travel encountering said tappet, the lever 42, is rocked about its fulcrum in the direction for moving the loose clutch member, 13, of the axle, 3, into engagement with the clutch member, 14, fast on said axle. This same movement of the lever by means of the connection of said lever by the links, 41, with the lever arm, 40, of the rock shaft, 37, rocks the mutilated gear, 36, from the position at which it is shown in Fig. 1 over toward and ultimately to the position shown in Fig. 2, and by the engagement of said mutilated gear, 36, with the coöperating mutilated gear, 34, causes the last-mentioned mutilated gear to pull forward the link, 33, and rock the lever, 30, in the direction for lifting the bearing, 29, of the shaft, 17, and disengaging the worm, 31, from the worm-wheel, 32, thereby cutting off the power from the apron-driving shaft, 10, and causing the apron to come to rest at the end of its delivery travel. Inasmuch as the movement described for disengaging the drive connections is to be caused by the apron travel itself, it is desirable to provide means which shall insure the completion of the disengaging movement by lifting the worm 31, entirely clear of the worm-wheel, 32, notwithstanding the power will be cut off from the apron and the apron will perhaps come to rest before the worm is entirely out of clutch with the tips of the teeth of the worm wheel. For this purpose there is provided a spring, 55, coiled about the link, 33, between a stop-shoulder, 33ª, thereon and a stop-bracket, 33ᵇ, mounted upon the side of the spreader box, and having an elongated eye or slot, 33ᶜ, through which the link extends; and this spring is so proportioned that it is under compression when the link, 33, is thrust rearward to the position at which it holds the worm, 31, engaged with the worm-wheel. At this position, however, the pivotal connection of the forward end of the link, 36, with the mutilated gear, 34, at a point eccentric to the latter, is situated just below the line connecting the axis of said mutilated gear with the opposite pivotal connection of the link,—that is, its connection with the lever, 30; and at this position the link is at the lower end of the elongated slot or eye, 33ᶜ, in the bracket, 33ᵇ, above mentioned, so that it cannot be depressed any lower. The stress of the depressed spring, therefore, which by reason of the position of the pivotal connection of the forward end of the link with the mutilated gear, as stated, would tend to rock said mutilated gear in a direction to carry said forward end of the link downward operates to lock the connections in the position shown in Fig. 1, holding the worm, 31, securely in mesh with the worm wheel, 32. Upon the rocking of the shaft, 37, in the direction by which it is rocked by the encounter above described of the forward slat of the lower ply of the apron with the tappet or lever arm, 50, it will be seen that as soon as the pivot of the forward pivotal connection of the forward end of the link, 33, with the mutilated gear, 34, is carried up past the line connecting the axis of said gear with the rear pivotal connections of the link, the stress of the spring reacting from its compression, operates to assist the movement which is thus begun, and insures its completion and the entire disengagement of the worm, 31, from the worm gear, 32, even though the apron's movement may have been terminated by the partial engagement of said worm and worm gear; and the worm is thereby carried entirely out of the range of the worm gear, as is clearly shown in Fig. 2.

The construction shown comprises another means for accomplishing the same result. Upon the initial encounter of the forward slat of the lower ply of the apron with the lower end of the tappet, 50, as the apron is completing its delivery travel, the rocking of the rock shaft, 37, first carries the mutilated gear, 36, from the position shown in Fig. 1 to the position shown in Fig. 5, at which the single middle tooth, 36ª, of the gear, 36, encounters one of the two teeth, 34ª, of the mutilated gear, 34. From the form of these teeth and the relative position of the two mutilated gears, this encounter occurs at what may be called a "bad angle",—that is, an angle that is not the most favorable for easy engagement of said teeth to transmit the rocking movement of the gear, 36, to the gear, 34; and also when this encounter occurs, the first movement which can be thereby transmitted to the gear, 34, is one which must further compress the spring, 55. Particularly on account of the bad angle, but additionally on account of the resistance of the already compressed spring, the coöperating movement of the mutilated gears, 36 and 34, will be halted at this stage, slightly, while the continued pressure of the apron against the tappet, 50, causes the apron itself to be backed up a little as to its lower ply and put under tension as to the portion of the chain extending forward from said foremost link of the lower ply around the idle sprocket wheel at the forward end, and also as to the entire length of the upper ply of the apron; and by the time the resistance to the engagement of the mutilated gears, 34 and 36, has been overcome, the stretch of the apron, that is to say of the chains which carry the slats,—from the point of encounter of the foremost slat of the lower ply with the tappet, 50, forward around the idle sprocket wheel and back to the driving wheel of the shaft, 10, is sufficient so that the reaction therefrom which happens as soon as the gear, 34, starts to move and carries the pivot of the forward end of the lever, 33, up past the lapping line, is sufficient to complete the swing of the tappet, 50, and the pull of the link, 33, upon the lever, 30, for completely disengaging the worm, 31, from the worm wheel, 32, even without regard to the assistance afforded in such disengagement by the spring, 55.

In Fig. 3 the loose clutch member, 13, is shown at the position to which it is moved by the action of the apron above described which disengages the worm, 31, from the worm wheel, 32. It will be understood, therefore, that this automatic action,—that is, the shifting of the clutch by the travel of the apron, causing the apron, so to speak, to stop itself does not affect an engagement of the clutch which would cause the apron to be driven in the reverse direction for returning it to loading position. For such engagement of the clutch members, 13 and 14, it is necessary for the driver to operate the hand lever, 60, which is connected by a link, 61, with the tappet or lever arm, 50, for moving the latter farther than it is moved by the encounter of the rear slat of the lower ply of the apron in its delivery travel.

When by the operation of the hand lever, 60, the apron has been engaged for its forward or return travel to loading position, the front slat of the upper ply of said apron at the proper limit of that return travel encounters the lower portion of the lever arm, 60, near its fulcrum, which lower portion may be considered as a tappet for the action about to be described, and rocks the lever arm in the opposite direction from that above described for engaging the clutch member, causing said lever arm to operate the tappet or lever arm, 50, and thereby through the link connections above described, the bell-crank lever, 42, for moving the loose clutch member, 13, in direction to disengage it from the clutch member, 14, thereby causing the apron to come to rest at proper position for re-loading. Incidentally, not constituting a part of the present invention, it may be noticed, that in order to prevent the apron from running in the delivery direction by the weight of the load when standing upon an incline sloping in the proper direction from such result,— which would cause the load to be jammed against the beater before starting the action of the latter for spreading,—as for example while driving from the loading place to the field where distribution is to be made,— there is provided on the shaft of one of the idle sprocket wheels, 9, a ratchet wheel, 65, which is engaged by a detent pawl, 66, operating when engaged to resist the rotation of the ratchet wheel, and thereby of the sprocket wheel, in the direction for rearward or delivery travel of the apron. This pawl is held up out of engagement with the ratchet wheel by a finger, 67, on the lever, 60, at the position shown in Fig. 2,—that is, the position to which it is moved by the action of the apron in its delivery travel, and at which it stands when the apron is disengaged both from the return driving clutch, 14, and from the delivery driving train.

The beater, 70, is driven from the left hand traction wheel by a chain, 71, passing around a sprocket wheel, 72, on the beater shaft, 70ª, and a sprocket wheel, 73, whose hub, 73ª, has a clutch member, 74, said sprocket wheel being mounted on the axle and movable thereon into and out of engagement with the clutch hub rim, 75, on said left-hand traction wheel. For shifting the clutch member, 74, into and out of engagement with the clutch member, 75, a forked lever, 76, fulcrumed on the sill, and having each of its fork arms slotted or forked for engagement of trunnions of a shoe, 79, which is engaged with the peripheral groove, 80, in the hub of the sprocket wheel, has its opposite end provided with a cam slot, 82, engaged by a stud-and-roll abutment, 83, on the shorter arm of the lever, 84, whose longer arm is connected by a link, 85, extending to an operating hand lever, 86, having intermediate its ends a tappet, 87, positioned to be encountered by the last slat of the lower ply of the apron as it finishes its delivery travel, for thrusting the link, 85, forward, and by means of the levers, 84 and 81, sliding the sprocket wheel, 73, and clutch member, 74, on the axle to disengage it from the clutch member, 75, on the hub of the drive wheel. The engagement is effected by means of the hand lever, 86, no means for automatic engagement being provided.

I claim:—

1. In a spreader, in combination with an endless carrier apron, a continuously rotating shaft; a clutch member fast on the shaft; a gear fast on the shaft; a second clutch member loose on the shaft for engagement with the first mentioned clutch member; a sprocket wheel rigid with the loose clutch member, and means by which it drives the apron in its return movement to loading position; a speed-reducing train driven by said gear and means by which said train drives the apron in its delivery travel, said train comprising a member which is movable for disengagement of the train, and automatic means for so moving said member at the limit of the delivery travel of the apron comprising a lever engaging the loose clutch member for shifting it into and out of engagement with the other clutch member, and connections by which said lever engages said movable member of the train for engaging the train members with each other by the opposite movement of the lever from that by which the clutch members are engaged with each other.

2. In a spreader in combination with an endless carrier apron, a continuously rotating shaft; a clutch member fast on the shaft; a gear fast on the shaft; a second clutch member loose on the shaft for engagement with the first clutch member; a sprocket wheel rigid with the loose clutch member, and means by which it drives the apron in its return movement to loading position; a disengageable speed-reducing train and means by which it drives the apron in its delivery travel, said train being driven by said gear; a lever engaging the loose clutch member for shifting it into and out of engagement with the other clutch member, and connections by which the lever engages the train members with each other by the opposite movement from that by which it engages the clutch members with each other; and connections for operating said lever, comprising a tappet positioned to be actuated by the carrier apron at the limit of its delivery travel for moving the lever in the direction for disengagement of the train members from each other.

3. In a spreader in combination with an endless carrier apron, a continuously rotating shaft; a clutch member fast on the shaft; a gear fast on the shaft; a second clutch member loose on the shaft for engagement with the first clutch member; a sprocket wheel rigid with the loose clutch member, and means by which it drives the apron in its return movement to loading position; a disengageable speed-reducing train and means by which it drives the apron in its delivery travel, said train being driven by said gear; a lever engaging the loose clutch member for shifting it into and out of engagement with the other clutch member, and connections by which the lever engages the train members with each other by the opposite movement from that by which it engages the clutch members with each other; means for operating said lever, comprising a tappet positioned to be actuated by the carrier apron at the limit of its delivery travel for moving the lever in the direction for disengagement of the train members from each other, and a spring operating on the last named means which is put under tension by movement of said means in engaging said train, and which reacts to complete the disengaging movement.

4. In a spreader in combination with an endless carrier apron, a continuously rotating shaft; a clutch member fast on the shaft; a gear fast on the shaft; a second clutch member loose on the shaft for engagement with the first mentioned clutch member; a sprocket wheel rigid with the loose clutch member and means by which it drives the apron in its return movement to loading position; a disengageable speed-reducing train and means by which it drives the carrier apron in its delivery travel; a movable bearing for one member of said train; a lever engaging the loose clutch member for shifting it into and out of engagement with the other clutch member; a rock shaft mounted on the frame; a crank arm at the inner end of the rock shaft; a mutilated gear at the outer end of the rock shaft; a coöperating mutilated gear and a bearing in which the gear rocks; link connections from an eccentric point on said last mentioned mutilated gear wheel to said movable bearing, and a spring operating on said link connections which is put under tension by the movement of said connections in the direction for effecting engagement of the train, and which reacts for completing the disengaging movement.

In testimony whereof, I have hereunto set my hand at Plano, Illinois, this fifth day of November, 1914.

JOSEPH BODA.

Witnesses:
CHARLES D. BEEBE,
GEO. CORMACK.

Copies of this patent may be obtained for five cents each, by addressing the "Commissioner of Patents, Washington, D. C."